(12) United States Patent
Robbins et al.

(10) Patent No.: US 7,424,101 B2
(45) Date of Patent: *Sep. 9, 2008

(54) METHODS AND SYSTEMS FOR MAKING TELEPHONE CALLS

(75) Inventors: David C. Robbins, Grafton, MA (US);
James E. Haley, Aston, PA (US);
Douglas R. Jones, Medford, NJ (US);
Arthur Doskow, New York, NY (US)

(73) Assignee: Verizon Laboratories Inc., Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/812,183

(22) Filed: Jun. 15, 2007

(65) Prior Publication Data

US 2007/0242664 A1    Oct. 18, 2007

Related U.S. Application Data

(63) Continuation of application No. 10/317,937, filed on Dec. 12, 2002, now Pat. No. 7,251,317.

(60) Provisional application No. 60/347,608, filed on Jan. 10, 2002.

(51) Int. Cl.
*H04M 15/00* (2006.01)

(52) U.S. Cl. ............................ 379/114.21; 379/114.01; 379/114.27; 379/114.29

(58) Field of Classification Search ............ 379/114.01, 379/114.21, 114.22, 114.23, 114.27, 114.29, 379/115.02, 127.01, 127.04, 127.05, 142.01, 379/201.01, 201.02, 201.11; 370/352, 357, 370/493, 494, 495
See application file for complete search history.

(56) References Cited

U.S. PATENT DOCUMENTS

| | | | | |
|---|---|---|---|---|
| 6,324,269 B1 * | 11/2001 | Malik | ..................... | 379/114.23 |
| 6,608,888 B2 * | 8/2003 | Bedingfield et al. | ...... | 379/88.22 |
| 6,804,225 B1 * | 10/2004 | Lang | .......................... | 370/352 |
| 7,251,317 B1 * | 7/2007 | Robbins et al. | ........ | 379/114.21 |

* cited by examiner

*Primary Examiner*—Quoc D Tran

(57) ABSTRACT

Embodiments of the present invention relate to methods and systems for making a call. Such methods and systems may request the call using a network, initiate a first leg to a caller device based on the request, initiate a second leg to a receiver device based on the request, connect the first leg and the second leg to make the call, and bill the call to a account associated with the subscriber.

21 Claims, 11 Drawing Sheets

METHODS AND SYSTEMS FOR MAKING TELEPHONE CALLS

RELATED APPLICATIONS

This is a continuation of application Ser. No. 10/317,937, filed Dec. 12, 2002, now U.S. Pat. No. 7,251,317 which claims benefit of U.S. Provisional Application No. 60/347,608, entitled "Method for Click-to-Talk Service that Utilizes a Converged VOIP and PSTN Intelligent Network," filed Jan. 10, 2002, both of which are expressly incorporated herein by reference.

FIELD OF THE INVENTION

The present invention generally relates to the field of communications and, more particularly, relates to methods, systems, and articles of manufacture for making telephone calls.

BACKGROUND OF THE INVENTION

Various applications (including Web-based applications, software applications, hardware applications, services, etc.) may allow a user to make a telephone call from a Public Switched Telephone Network (PSTN) telephone to another PSTN telephone using an Internet Protocol (IP) network. However, these applications are typically limited in several ways. For example, some applications may be limited to placing calls from an enterprise to a customer (or a potential customer) of the enterprise and effectively serve simply as an equivalent to a toll-free number called by the (potential) customer. Other applications may be adapted to connect any two telephones, but can not bill the call directly to either telephone. Instead, the call may be billed to a credit card or some other account held by the caller, called party (receiver), or other party.

Some applications may use "softswitch" technology to handle most of the switching in the IP network and use IP_PSTN gateways to extend each leg of a call to the PSTN telephones. In such cases, the IP network may act as an interexchange carrier (IXC) and, therefore, preclude the use of a customer's preferred IXC.

These limitations and others restrict the use of these applications and make them inconvenient for customers or subscribers. Prior applications also consume significantly more network resources than a call made directly from the caller to the receiver. In view of these drawbacks, it would be beneficial to provide for an IP-stimulated initiation of a PSTN-to-PSTN call that can be billed directly to a subscriber's PSTN telephone and that can consume minimal network resources.

SUMMARY OF THE INVENTION

Methods, systems, and articles of manufacture of the present invention may be adapted to consume minimal network resources to initiate a PSTN-to-PSTN call. Further, in accordance with embodiments of the invention, such calls may be billed directly to a PSTN telephone account.

One exemplary embodiment of the invention relates to a method for making calls. The method may include: receiving a request to make a call from a first network; initiating a first leg to a caller device based on the request; initiating a second leg to a receiver device based on the request; connecting the first leg and the second leg to make the call; and billing the call to a subscriber's telephone account on the second network.

Another exemplary embodiment of the invention relates to a method for substituting a subscriber number. The method may include: specifying the subscriber number in a setup message; sending a query message when the setup message triggers a setup trigger; recognizing a calling party identification; and sending a response message. The query message may contain the subscriber number and at least one of the calling party identification and a charge number. The response message may contain the subscriber number substituted in the at least one of the calling party identification and the charge number.

Yet another exemplary embodiment of the invention relates to another method for making a call. The method may include: receiving a request to make the call using a first network; delivering the request from the first network to a second network; initiating, over the second network, a first leg to a caller device based on the request; forwarding, over the second network, a second leg to a receiver device; connecting, over the second network, the first leg and the second leg to make the call between the caller device and the receiver device; and billing the call to a subscriber's telephone account on the second network.

Another exemplary embodiment of the invention relates to still another method for making a call. The method may include: providing a request to make the call using a first network; delivering the request from the first network to a second network; initiating, over the second network, a leg to a caller device based on the request; originating, over the second network, the call between a caller device and a receiver device based on the request; and billing the call to a subscriber's telephone account on the second network.

Additional embodiments and aspects of the invention are set forth in the detailed description which follows, and in part are obvious from the description, or may be learned by practice of methods, systems, and articles of manufacture consistent with the scope of the present invention. It is understood that both the foregoing general description and the following detailed description are exemplary and explanatory only and are not restrictive of the claimed embodiments of the invention.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings.

DESCRIPTION OF THE EMBODIMENTS

Embodiments of the present invention relate to methods, systems, and articles of manufacture for making telephone calls. The exemplary systems and methods disclosed herein propose several alternatives for implementing a PSTN-to-PSTN call and for a network protocol to be used to initiate the call. The initiated call may be billed to a subscriber, consistent with the subscriber's service profile (e.g., services, restrictions, preferences, or features associated with the subscriber). Additionally, the initiated call may be processed such that the call appears to a receiver and/or to the subscriber as if the call initiated from the subscriber's telephone. Also, the initiated call may be processed to utilize minimal network resources when making the call.

Reference is now made in detail to exemplary embodiments of the invention, examples of which are illustrated in the accompanying drawings. Wherever possible, the same reference numbers are used throughout the drawings to refer to the same or like parts.

Some of the exemplary embodiments disclosed herein refer to the following documents and standards, all of which are expressly incorporated herein by reference in their entireties: *AINGR: Switch—Intelligent Peripheral Interface (IPI)*, Telcordia Technologies, GR-1129-CORE, Issue 4, November 1999; *AINGR: Switching Systems*, Telcordia Technologies, GR-1298-CORE, Issue 6, November 2000; *AINGR: Switch—Service Control Point (SCP)/Adjunct Interface*, Telcordia Technologies, GR-1299-CORE, Issue 6, November, 2000; *Generic Requirements for ISDN PRI Two B-Channel Transfer*, Telcordia Technologies, GR-2865-CORE, Issue 2, May 1997; *SDP: Session Description Protocol*, IETF, RFC 2327, April 1998; *SIP: Session Initiation Protocol*, IETF, RFC 2543, 2001; *The PINT Service Protocol*, IETF, RFC 2848, June 2000; *2000 Version of National ISDN Primary Rate Interface (PRI) Customer Premises Equipment (CPE) Generic Guidelines*, Telcordia Technologies, SR-4994, Issue 1, December 1999; *Switching System Generic Requirements Supporting ISDN Access Using the ISDN User Part*, Telcordia Technologies, TR-NWT-000444, Issue 3, May 1993; *ISDN Primary Rate Interface Call Control Switching and Signaling Generic Requirements for Class II Equipment*, Telcordia Technologies, TR-NWT-001268, Revision 4, March 1998; *Bell Communications Research Specification of Signaling System Number 7*, Telcordia Technologies, GR-246-CORE, Issue 3, December 1998; *LSSGR: Switching System Generic Requirements for Call Control Using the Integrated Services Digital Network User Part (ISDNUP)*, Telcordia Technologies, GR-317-CORE, Issue 3, November 1999; and *LSSGR: Switching System Generic Requirements for ICI Using the ISDNUP, (A Module of LSSGR, FR-64)*, Telcordia Technologies, GR-394-CORE, Issue 3, November 1999.

Figure 1:
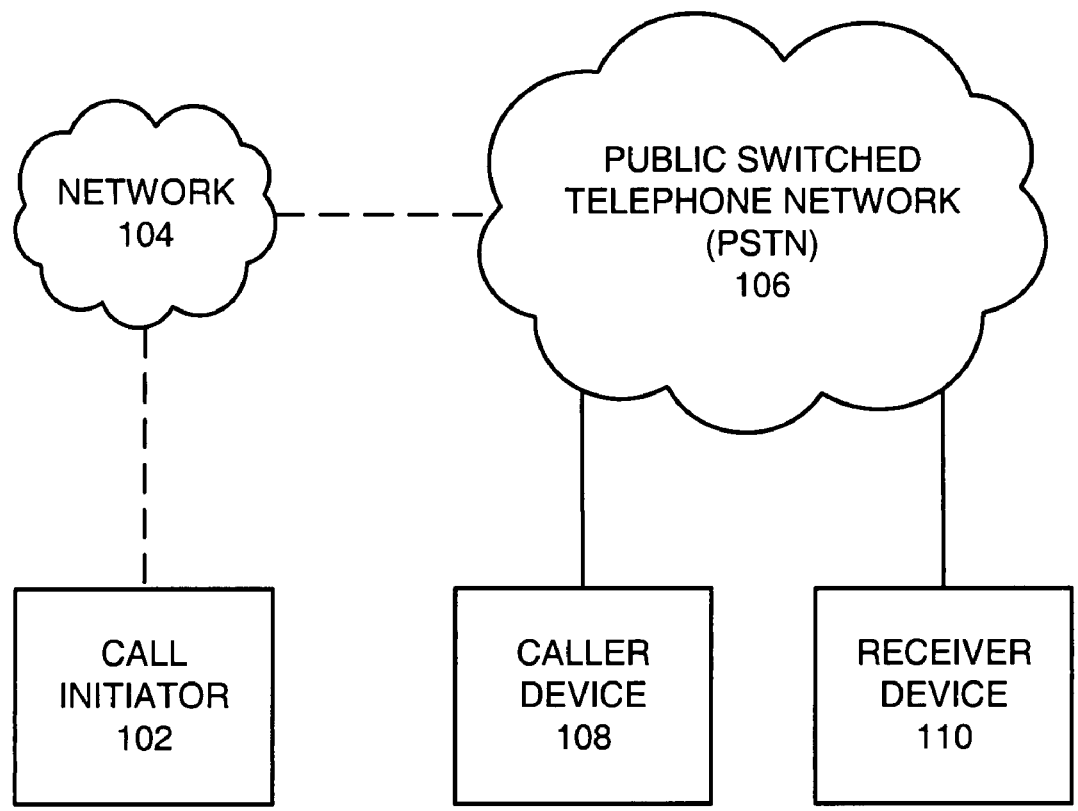
FIG. 1 illustrates a first exemplary system, consistent with embodiments of the present invention, for making a telephone call between PSTN endpoints.

FIG. 1 illustrates an exemplary system 100 for placing a telephone call, consistent with embodiments of the present invention. The system 100 may include a call initiator 102, a network 104, a PSTN 106, a caller device 108, and a receiver device 110. The call initiator 102 may be coupled to the network 104. The network 104 may be coupled to the PSTN 106. The caller device 108 and receiver device 110 may be coupled to the PSTN 106. As used herein, "coupling" may include direct or indirect connections between elements. Coupling may involve Ethernet links, SS7, voice trunks, and loops, as described below, or any other connection compatible with embodiments of the present invention.

The call initiator 102 may include a computer, software, hardware, or any other component or mechanism for sending a request to communicably connect the caller device 108 and the receiver device 110. For example, the call initiator 102 may be a computer, a wireless application protocol (WAP) phone, and/or some other Internet portal, whereby a user may send a request to initiate a call via an Internet website, an e-mail message, an Instant Message, etc. In another example, the user may use a cursor to "click" a button or link in a graphical user interface (GUI) presented by the call initiator 102. The "click" may cause the call initiator 102 to send the request to initiate the call. As part of this process, the user may be required to input or provide information for the request. Additionally, or alternatively, such information in whole or in part may be stored and recalled during call initiation. As one of ordinary skill in the art can appreciate, additional techniques and systems may be used to send or generate the request to initiate the call.

The request may include various information, including the telephone number(s) associated with a subscriber, the caller device 108, and/or the receiver device 110. The request may be delivered through the network 104 to the PSTN 106. Various protocols may be used to the deliver the request and initiate the call. Examples of protocols may include the PSTN and Internet Internetworking Working Group (PINT) Service Protocol defined in RFC 2848, as referenced above, the Half-PINT protocol, the Session Initiation Protocol (SIP), the Session Description Protocol (SDP), extensions of SIP or SDP, and/or any other protocol compatible with embodiments of the invention.

The network 104 may include an IP network, Asynchronous Transfer Mode (ATM) network, a local area network (LAN), a metropolitan area network (MAN), a wide area network (WAN), the public Internet, a private network, a virtual private network, an ad hoc network, etc. The network 104 may include one or more of wired and/or wireless communications. Wireless communications may include radio transmission via the airwaves, however, those of ordinary skill in the art can appreciate that various other communication techniques can be used to provide wireless transmission including infrared line of sight, cellular, microwave, satellite, Bluetooth packet radio, spread spectrum radio, etc. Wireless data may include, but is not limited to, paging, text messaging, e-mail, Internet access, and other specialized data applications specifically excluding, or including voice transmission.

The PSTN 106 may be implemented using conventional, circuit switched local and/or long-distance network(s). The PSTN 106 may include end-office switching systems, local tandem switches, access tandem switches, Common Channel Signaling System No. 7(SS7) trunks from end-office to end-office, SS7 trunks from end-office to tandem switches, and SS7 signaling networks which include Signaling Transfer Points (STPs) that route out-of-band signaling between component signaling points and SS7 signaling links. By way of a non-limiting example, PSTN 106 may be a Verizon telephone network, a local PSTN, a long distance PSTN, etc. As one of ordinary skill in the art can appreciate, the PSTN 106 may include one or more combinations of smaller PSTNs.

SS7 is a signaling protocol used to exchange information between network elements. Depending on its country of implementation, it may refer to a standard for telecommunications defined by the International Telecommunication Union (ITU) Telecommunication Standardization Sector, or a standard defined by Committee T1 of the American National Standards Institute. The standards are similar in function, but may differ slightly in message encoding. Each standard defines the procedures and protocol by which network elements in a PSTN exchange information over a digital signaling network to effect wireless and wireline call setup, routing, and control. An SS7 network and protocol can be used for such services as basic call setup, management and tear down, local number portability (LNP), toll-free service, enhanced call features (e.g., call forwarding, calling party name/number display, three-way calling, etc.), efficient and secure worldwide telecommunications, etc.

The caller device 108 and/or the receiver device 110 may be a PSTN telephone, facsimile machine, modem, or other device/system capable of facilitating communication over a PSTN. Alternatively, the receiver device 110 may be an IP telephone, a cellular telephone, or other device/system capable of facilitating communication over an IP network, a cellular network, or any other type of network.

Figure 2:
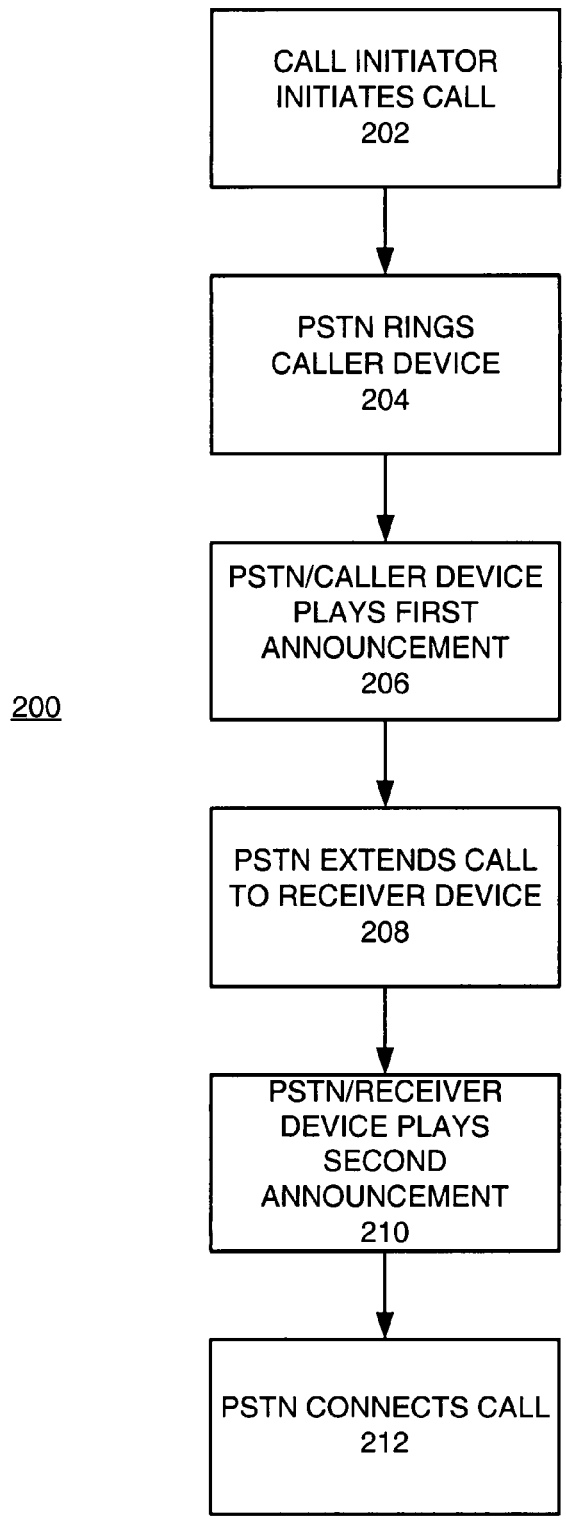
FIG. 2 illustrates a first exemplary method, consistent with embodiments of the present invention, for making a telephone call between PSTN endpoints.

According to an embodiment of the present invention, system 100 of FIG. 1 may be configured to partly or wholly implement the exemplary method in the flowchart 200 of FIG. 2 for the network-stimulated initiation of a PSTN-to-PSTN call, which can be billed directly to a subscriber's PSTN telephone number. For example, as illustrated in FIG. 2, a user (not shown) may use the call initiator 102 to initiate a call (step 202). This may involve sending a request to initiate the call as described above. The call initiator 102 may send the request through the network 104 to the PSTN 106. The PSTN 106 may ring the caller device 108 (step 204). When the caller device 108 receives and acknowledges (manually or automatically) the ring from the PSTN 106, the caller device 108 may optionally play a first announcement (step 206). Announcement(s) may be stored on the caller device 108 and played by the caller device 108 or announcement(s) may be stored outside the caller device 108 (e.g., stored on and played from the PSTN 106, the network 104, etc.) and relayed through the caller device 108 (i.e., the caller device 108 may act as an end station and relay announcements). By way of a non-limiting example, the first announcement may include a statement indicating that the caller device 108 will be used to connect a call initiated by the user and/or any other relevant information.

After a caller (not shown) acknowledges the call at the caller device 108, the call may be extended to the receiver device 110 via the PSTN 106 (step 208). During this step, the caller may hear a ring-back tone until a called party (not shown) at the receiver device 110 answers. When the receiver device 110 receives and acknowledges the call extension, the receiver device 110 may optionally play a second announcement (step 210). Announcement(s) may be stored on the receiver device 110 and played by the receiver device 110 or announcement(s) may be stored outside the receiver device 110 (e.g., stored on and played from the PSTN 106, the network 104, etc.) and relayed through the receiver device 110 (i.e., the receiver device 110 may act as an end station and relay announcements). By way of a non-limiting example, the second announcement may include a statement indicating that the receiver device 110 is currently being used to connect a call and/or any other relevant information. The PSTN 106 may then connect the call between the caller device 108 and the receiver device 110 (step 212). The call may be connected using any conventional method (switchboard, call routing, etc.) that is compatible with the embodiment of FIG. 2. The calling party identity presented to the receiver device 110 may be that of the subscriber's PSTN telephone line, provided Calling Party Presentation Restrictions (CPPRs) do not apply.

Both legs (to the caller device 108 and to the receiver device 110) of the connected call may be billed to a subscriber's PSTN telephone line. The subscriber may be the user that initiated the call at step 202, a caller using the caller device 108 to communicate through the connected call, a receiver using the receiver device 110 to communicate through the connected call, or some other entity subscribing to a service on the PSTN. The subscriber, user, caller, and/or receiver may be the same entity. The connected call may appear in the billing process as if the subscriber originated the connected call on his/her PSTN telephone. In connecting the call, the system 100 may respect the subscriber's carrier choices (both intra-Local Access and Transport Area (LATA) and inter-LATA, as appropriate) and all other attributes, services, and features applicable to similar calls from the subscriber's line.

Examples of other attributes, services, and features may include a telephone line's primary inter-exchange carrier, local carrier, class of service (e.g., flat rate, measured rate, etc.), toll restrictions, 1010XXXX blocking, caller identification blocking, call forwarding, speed calling, voice mail, Advanced Intelligent Network (AIN) services, etc.

In performing the exemplary method illustrated in FIG. 2, system 100 may ensure that the PSTN 106 exclusively carries an initiated call in its final configuration (i.e., when the two legs of the call have been bridged) using as few network 104 resources as possible. The initiated call may utilize additional network 104 resources prior to the time the caller device 108 and the receiver device 110 are connected together.

Figure 3:
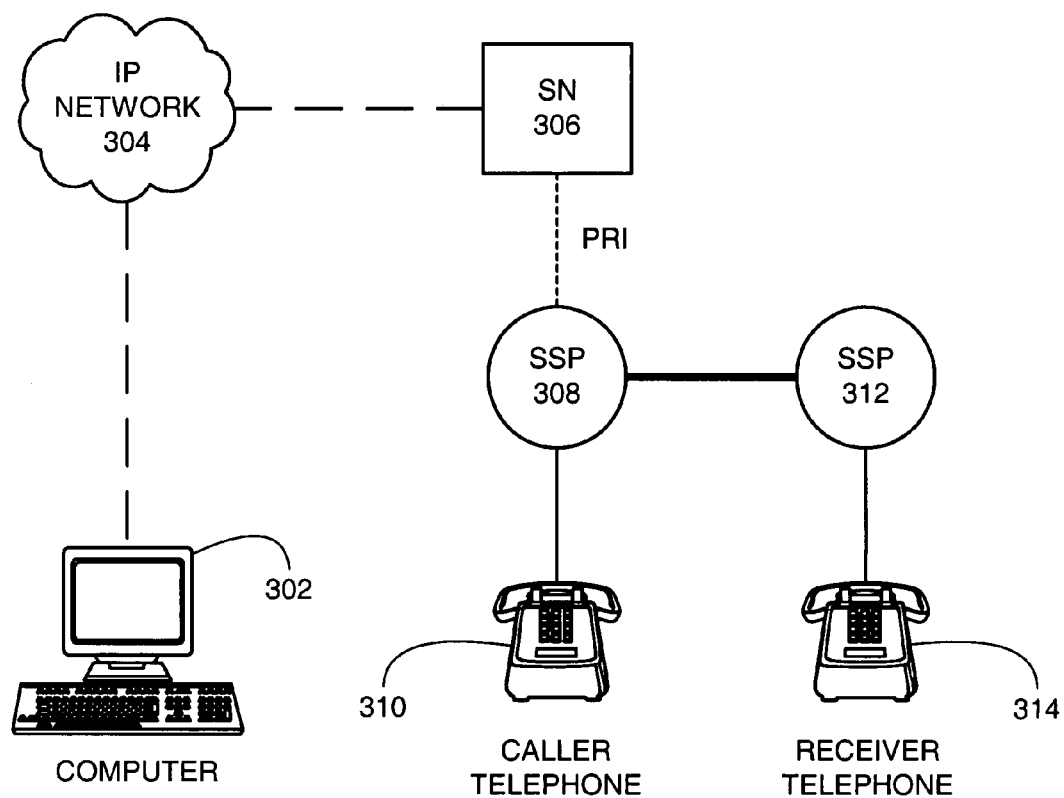
FIG. 3 illustrates a second exemplary system, consistent with embodiments of the present invention, for making a telephone call between PSTN endpoints.

In another embodiment of the present invention, an exemplary system 300 illustrated in FIG. 3 may be used to initiate a call between two PSTN endpoints. The system 300 may include a computer 302, an IP network 304, a service node (SN) 306, a first service switching point (SSP) 308, a caller telephone 310, a second SSP 312, and a receiver telephone 314. The computer 302 may be coupled to the IP network 304. The IP network 304 may be coupled to the SN 306. The SN 306 may be coupled to the first SSP 308. The first SSP 308 may be coupled to the caller telephone 310 and the second SSP 312. The second SSP 312 may be coupled to the receiver telephone 314. The coupling between the SN 306 and the first SSP 308 may include, for example, an integrated services digital network (ISDN) primary rate interface (PRI). By way of a non-limiting example, the computer 302, the IP network 304, and the SN 306 may be coupled together via an IP connection (e.g., Ethernet cable, fiber cable, etc.). The SSPs 308 and 312 may be connected directly or indirectly by voice trunks as part of a PSTN. The telephones 310 and 314 may be coupled to a local end office (e.g., a SSP, etc.) via "loops". A "loop" may be any mechanism (e.g., a loop of copper wire, an analog loop carrier system, a digital loop carrier system, etc.) that can carry signaling information (e.g., dialed digits, on or off hook, ring phone, etc.) and bearer information (e.g., voice conversation, modem tones, etc.) between the local end offices 308 and 312 and the telephones 310 and 314.

As one of ordinary skill in the art can appreciate, the computer 302 may be any device or system that facilitates a user's request to initiate a call. Some examples include: desktop computers; laptops computers; mainframes; application specific electronic/mechanical devices; and/or any other mechanisms that can facilitate the request.

By way of a non-limiting example, service node 306 may include a PSTN element, capable of receiving calls, that provides specialized services such as collecting account information, playing voice prompts and recordings, and/or providing various interactive services. Examples may include calling card platforms, voice response units, voice mail systems, etc.

The SSPs 308 and 312 are end-office switching system(s) that may be capable of performing AIN functions. The SSPs 308 and 312 may be capable of implementing AIN triggers, launching AIN queries, accepting AIN response messages, and/or continuing with call processing based on an AIN response message. Although FIG. 3 illustrates the SSPs 308 and 312 as being separate devices, this is only done in order to demonstrate that this implementation is viable when the telephones 310 and 314 are coupled to different SSPs. However, this implementation may be equally effective in the event that the telephones 310 and 314 are connected to a single SSP.

As illustrated in FIG. 3, system 300 may include the IP network 304, but as one of ordinary skill in the art can appreciate and as previously explained, other types of networks may be used instead. Although the system 300 may use caller and receiver telephones 310 and 314, other PSTN end user devices/systems as described above may be used instead.

Figure 4:
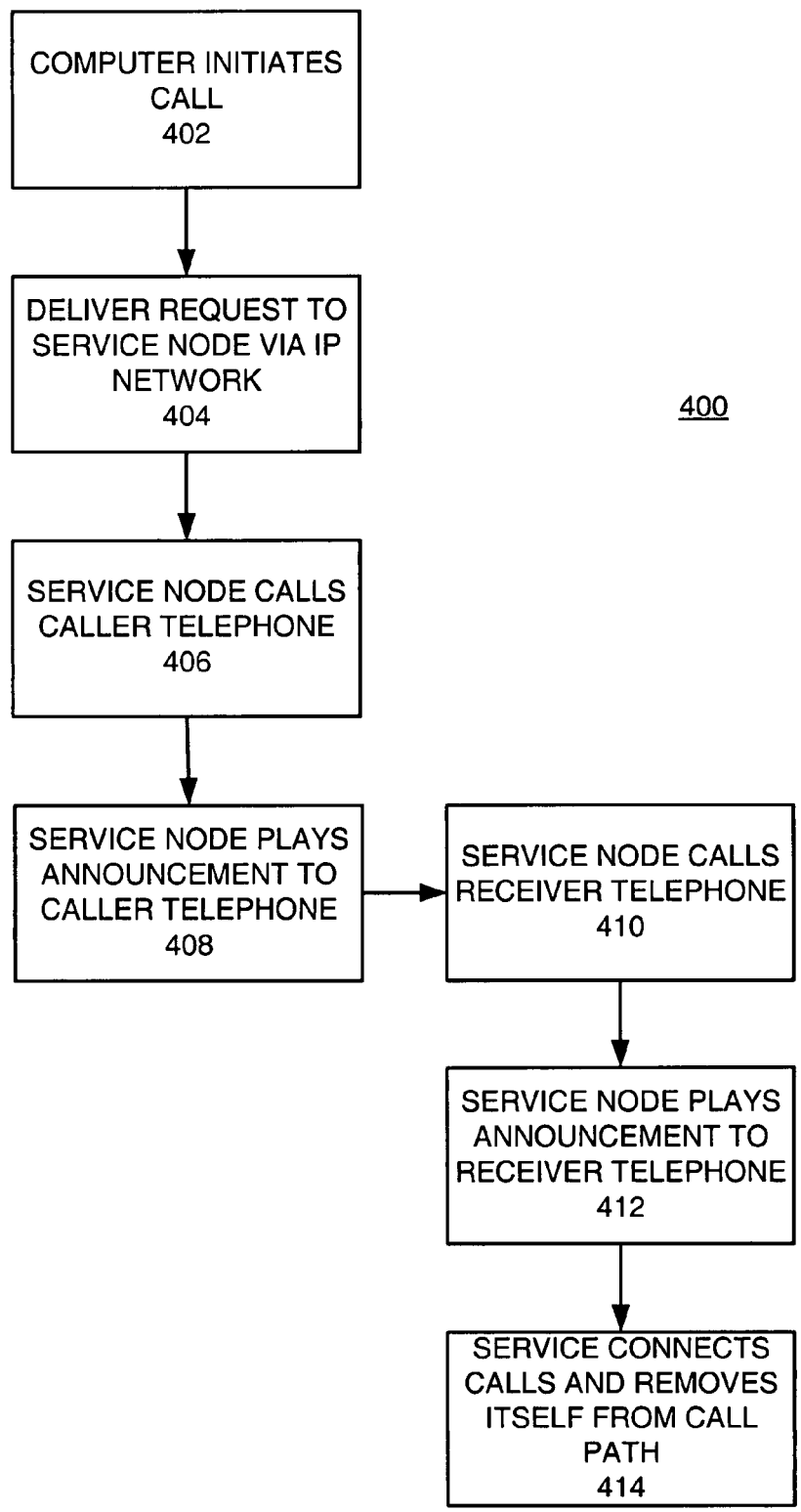
FIG. 4 illustrates a second exemplary method, consistent with embodiments of the present invention, for making a telephone call between PSTN endpoints.

According to an embodiment of the present invention, the system 300 may be configured to implement the exemplary method illustrated in flowchart 400 of FIG. 4. For example, a user (not shown) may perform an action to initiate a user-requested call (step 402). The action may involve the use of an application (e.g., a Web browser, an e-mail client, etc.) on the computer 302 to cause the user-requested call to facilitate communication between the caller telephone 310 and the receiver telephone 314. The action may include, inter alia, "clicking" a button or a link on a Web page using the computer 302. As part of this process, the user may also be required to input or provide information for the request. Additionally, or alternatively, such information in whole or in part may be previously stored and recalled during call initiation. As one of ordinary skill in the art can appreciate, additional techniques and systems may be used to send or generate the call request.

Once the call request is made by the user, the IP network 304 may deliver the request to the SN 306 (step 404). The SN 306 may initiate a first SN call to a PSTN endpoint, the caller telephone 310 in this example (step 406). When the user or a caller answers the first SN call, the SN 306 may play an appropriate announcement, if any (step 408). The SN 306 may then initiate a second SN call to another PSTN endpoint, the receiver telephone 314 in this example (step 410). The second SN call may be initiated using a subscriber's carrier choice that is applicable to the user-requested call. If the subscriber is the same entity as the user or the caller, the SN 306 may initiate the second SN call using the user's carrier choice or the caller's carrier choice, respectively. The subscriber's telephone number may be used as the calling party number when the SN 306 calls the receiver telephone 314. If an announcement is to be played to a receiver, the SN 306 may play the announcement when the receiver answers the second SN call on the receiver telephone 314 (step 412). The announcements played to the caller and the receiver may be the same or different. The SN 306 may connect the first and second SN calls (one to the caller telephone 310 and one to the receiver telephone 314) together at SSP 308 before or after the receiver answers the second SN call to the receiver telephone 314 (step 414). As one of ordinary skill in the art can appreciate, the two SN calls may be connected using, for example, Two B-Channel Transfer as described in GR-2865-CORE, referenced above.

The Two B-Channel Transfer may be used at step 414 to connect the two SN calls together without consuming resources related to the SN 306 (i.e., the SN can be removed from the completed call path after the two calls are connected). If the Two B-Channel Transfer is not used, the SN 306 could internally connect the two SN calls for the duration of the user-requested call. However, the use of Two B-Channel Transfer releases those B channels at the point where the SN 306 has no need of further involvement in the user-requested call, which allows the SN 306 to be provisioned with fewer B channels to serve a given call volume. If the SN 306 removes itself from further involvement in the user-requested call after connecting the two SN calls, then the SN 306 may either play an announcement to the receiver before removing itself or forego playing the announcement.

In order to ensure that the user-requested call appears to the billing process as if the subscriber originated the call on his/her PSTN telephone (not necessarily shown) and that the calling line identity presented to the receiver telephone 314 is that of the subscriber's PSTN telephone, the SN 306 may specify the subscriber's telephone number as the calling party number in the SETUP message that initiates the second SN call to the receiver telephone 314 at step 406. SSPs 308 and 312 may accept that subscriber number as valid for calling line identification and billing purposes. Ordinarily, an SSP that meets the requirements of TR-NWT-001268, as referenced above, will accept as valid only a subscriber number that is explicitly configured at the SSP as valid for the SN's PRI. Therefore, the subscriber number may be assigned to the subscriber line, not to the SN's PRI, and hence would not be accepted as valid when sent by the SN. This may prevent the user-requested call from appearing to the billing process as if the subscriber originated the call on his/her PSTN telephone and presenting the desired caller line identity to the receiver telephone 314, provided that CPPRs do not apply. However, Section 11.1.1.9 of SR-4994 (2000 NI PRI CPE Generic Guidelines), as referenced above, describes a service called Delivery of User Provided Not Screened Calling Party Numbers (CPNs) that can facilitate exactly the kind of application under consideration here. Under this application, a subscriber-provided unscreened caller number may be accepted as valid, and treated as a PSTN-provided caller number.

Further, in order to ensure the user-requested call utilizes the subscriber's applicable carrier choice (both intra- and/or inter-LATA, as appropriate), the SN 306 may specify the subscriber's carrier choice in the SETUP message that initiates the second SN call to the receiver telephone 314. An SSP meeting the requirements of TR-NWT-001268 permits the SN 306 to do so via the Transit Network Selection information element in the SETUP message. In order to do this, the SN 306 may be provisioned with the subscriber's carrier choices and may be able to analyze the receiver telephone's 314 number to determine the appropriate carrier (e.g., inter-LATA, intra-LATA toll or local, etc.).

In addition to the subscriber's carrier choices, the SN 306 may also respect other attributes, features and services that affect calls made to and from the subscriber's line. For example, if the subscriber's line has toll restrictions, the second SN call from the SN 306 to the receiver telephone 314 may have to be screened consistently with the restrictions on the subscriber's line. The SN 306 may be provisioned with all relevant attributes of the subscriber's line. The SN 306 may take all relevant service and feature interactions into account. Further, if the subscriber line has a caller identification (ID) blocking feature, then the SN 306, SSP 308, and SSP 310 may not send or display the caller identification when calling or connecting the receiver telephone 314. The SN 306 may set a privacy indicator or some other parameter on the call to the receiver telephone 314 or when connecting the two SN calls.

Three potential problems arise if the SN 306 is not served by an SSP that serves the subscriber and/or caller lines. First, the first SN call from the SN 306 to the caller telephone 310 might cross rate center boundaries that would ordinarily make it billable. In such circumstances, additional arrangements, such as not billing the first SN call, would have to be made. Second, the second SN call might be billed at a different rate than it would have if it had actually originated at the caller telephone 310. In such circumstances, other arrangements, such as billing the second SN call as though it originated at the first SSP 308 serving the caller, may have to be made to properly bill the second SN call. Third, the second SN call from the SN 306 to the receiver telephone 314 might transit to the carrier's network through an access tandem different from the one that would have been used had the user-requested call originated from the caller telephone 310. In such circumstances, the carrier may block the call because the receiver telephone 314 number is not valid for the access tandem. Therefore, the first SSP 308 serving the SN 306 may route the second SN call to the subscriber's carrier through a path (not shown) from which the carrier will not block the user-requested call.

According to another embodiment of the present invention, the second SSP 312 in system 300 may not be a AIN-capable end office (e.g., an SSP) because an AIN feature (e.g., a termination-attempt trigger, a channel setup trigger, etc.) may not be required at the receiver telephone end to connect a call between the caller telephone 310 and the receiver telephone 314. Instead of SSP 312, a non-AIN-capable end office may be coupled to the SSP 308 (e.g., via a voice trunk, a data trunk, etc.) and to the receiver telephone 314 (e.g., via an analog loop carrier system, a digital loop carrier system, etc.).

Figure 5:
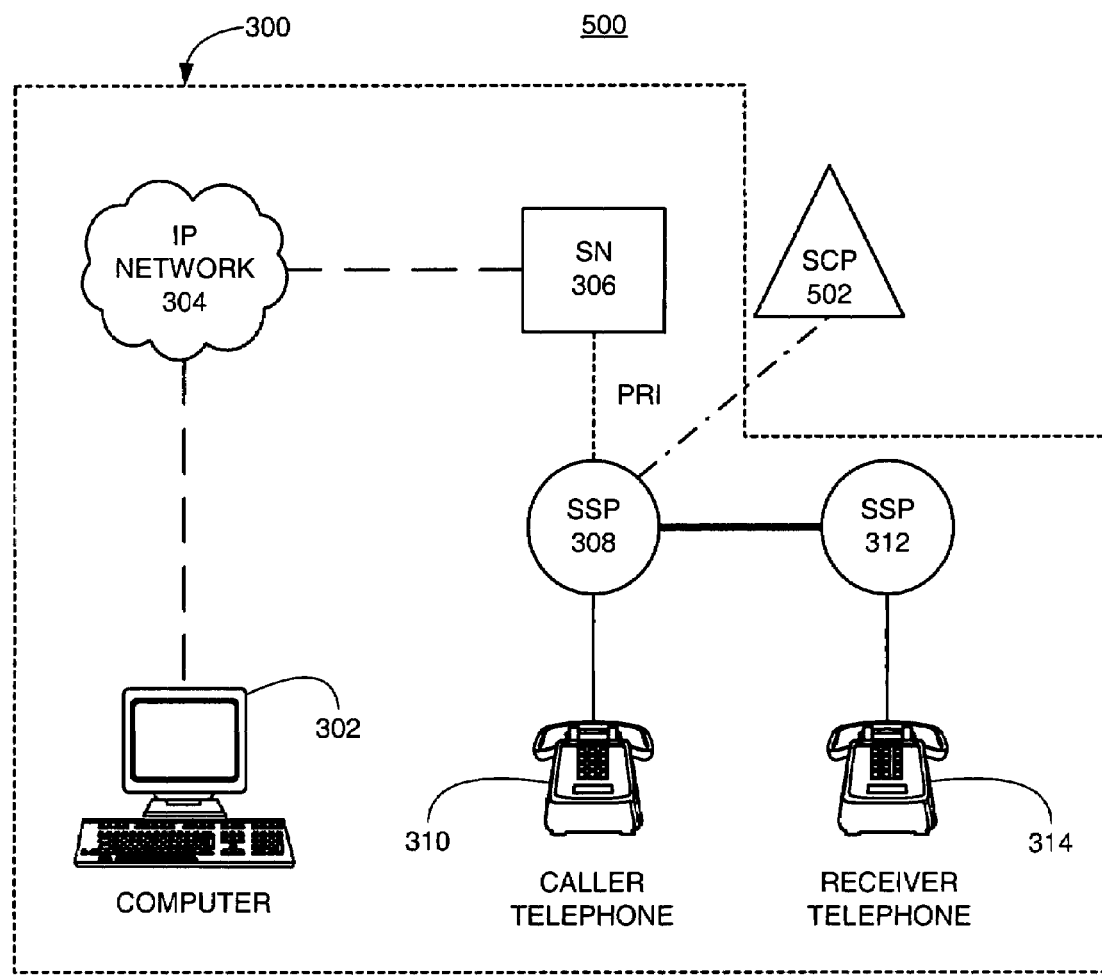
FIG. 5 illustrates a third exemplary system, consistent with embodiments of the present invention, for making a telephone call between PSTN endpoints.

In another embodiment of the present invention, the exemplary system 500 in FIG. 5 may be used to initiate a call between two PSTN endpoints. The system 500 includes all the elements 302-314 of system 300 with the addition of a service control point (SCP) 502. The SCP 502 may be any AIN entity that performs service control functionality. The SCP 502 may contain the service logic execution environment where AIN services may be deployed. The service logic may process and respond to an AIN query from other entities, such as an SSP. SCP 502 may be coupled to an SSP (i.e., SSPs 308 and 312). By way of a non-limiting example, the SCP 502 may be coupled to the SSP 308 via an SS7 common channel network, an IP network, an ATM network, or other mechanism capable of passing SS7 messages from one end-point to another end-point.

According to an embodiment of the present invention, the system 500 may be used to implement the exemplary method illustrated in the flowchart 400 of FIG. 4 in the same manner as described above for system 300, with the exception that the system 500 may take advantage of AIN capabilities to specify the subscriber number. More particularly, instead of relying upon the first SSP 308 to accept the subscriber number passed by the SN 306 as described above for the method in flowchart 400, the SCP 502 may use an AIN feature based on a channel setup trigger to perform the subscriber number substitution.

Figure 6:
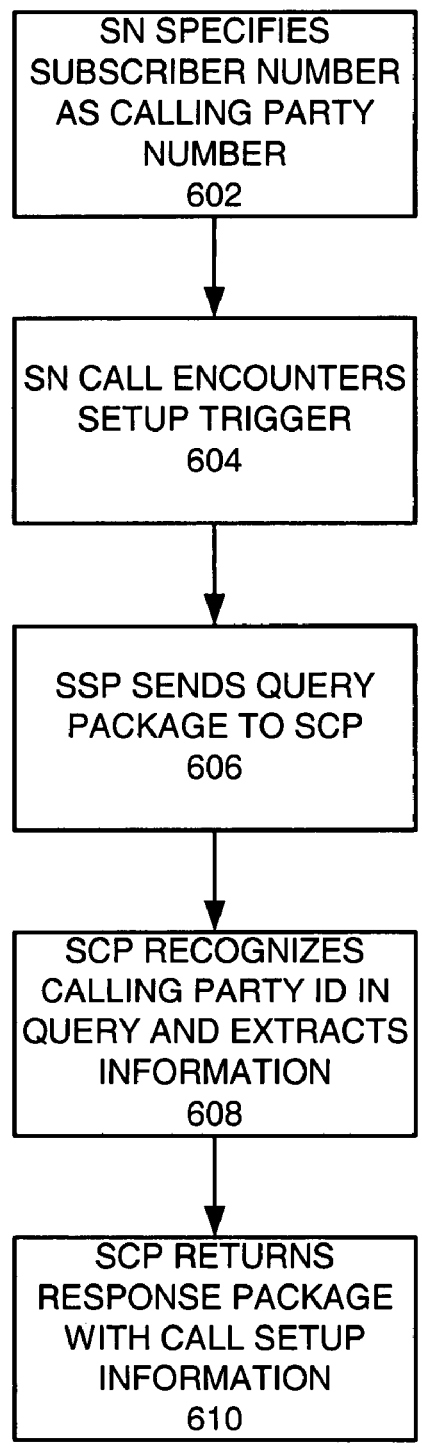
FIG. 6 illustrates an exemplary method, consistent with embodiments of the present invention, for substituting a subscriber number.

For example, the system 500 may implement steps 402-408 as previously described for system 300, but when the SN 306 makes the second SN call to the receiver telephone 314 at step 410 in FIG. 4, the system 500 may implement the exemplary method illustrated in the flowchart 600 of FIG. 6 to use the subscriber number as the calling party number. Consistent with an embodiment of the present invention, the SN 306 may specify the subscriber number as the calling party number in the SETUP message that initiates the second SN call (step 602). The SN 306's PRI channels may be provisioned with a Channel_Setup_PRI trigger. The second SN call may encounter the Channel_Setup_PRI trigger at SSP 308 (step 604) and cause SSP 308 to send a Query Package to the SCP 502 (step 606). This step may be performed because the calling party number supplied by the SN 306 will have failed screening or not have been screened. The first SSP 308 may perform the calling party number screening as specified in TR-NWT-001268, referenced above.

The Query Package sent to the SCP 502 may contain an Info_Collected TDP-Request Message, which may be populated with CallingPartyID, ChargeNumber, and GenericAddress parameters. The CallingPartyID may contain the number assigned to the SN 306. The ChargeNumber may contain the SN's 306 charge number. The GenericAddress may include a GenericAddressList parameter which may contain the calling party number (i.e., subscriber number) supplied by the SN 306 as a Supplemental User-Provided-Not-Screened or User-Provided-Failed-Screening number. The GenericAddress may be populated as specified in GR-1298-CORE Section 4.5.3.2, as referenced above, based on the calling party number screening.

The SCP 502 may recognize the CallingPartyID as that of the SN's 306 and may extract the subscriber number from the GenericAddress (step 608). The SCP 502 may return a Response Package to the first SSP 308 (step 610). The Response Package may contain an Analyze_Route message for the first SSP 308. The Analyze_Route message may be populated with ChargeNumber and CallingPartyID parameters, each containing the subscriber number. The first SSP 308 may resume processing the second SN call with the subscriber number specified as the calling party number and the charge number, and with the carrier specified by the SN 306. Following step 610, the system 500 may proceed to implement, for example, the remaining steps 412-414 in FIG. 4. Thus, other than the method for handling the calling party number described above with the flowchart 600, the system 500 may implement flowchart 400 to make a user-requested call as previously described.

Figure 7A:
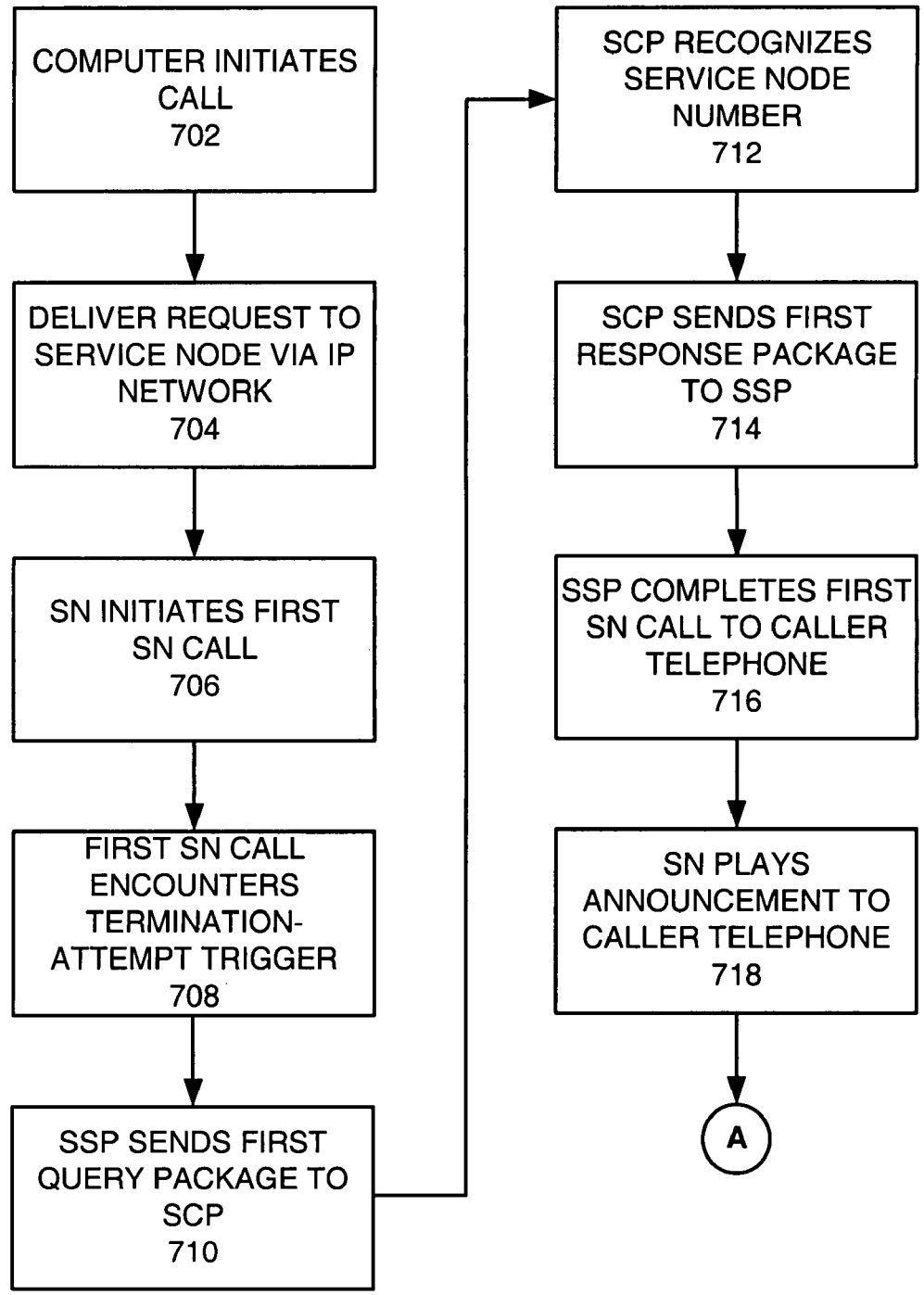
FIGS. 7A and 7B illustrate a third exemplary method, consistent with embodiments of the present invention, for making a telephone call between PSTN endpoints.
Figure 7B:
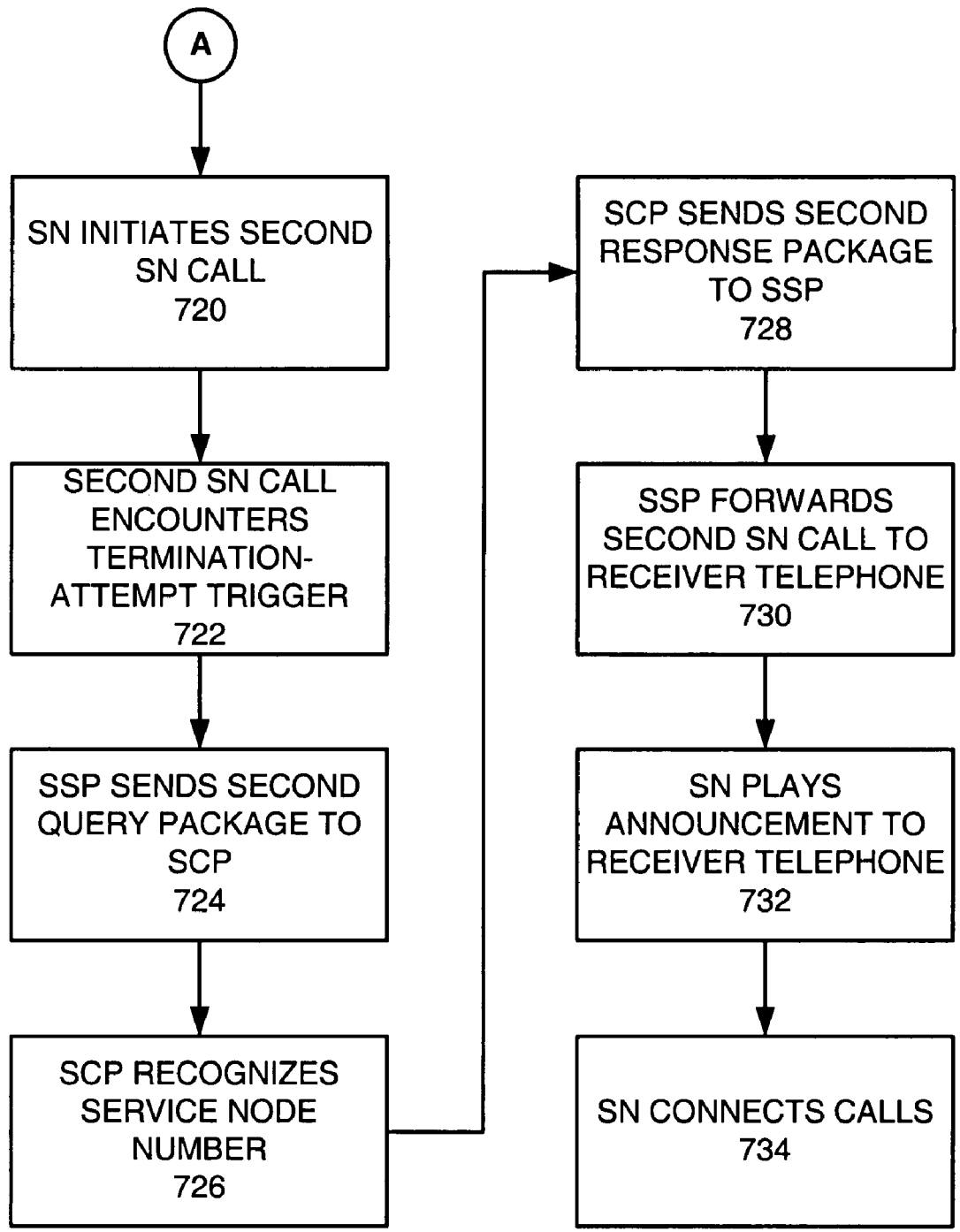

In another embodiment of the present invention, the system 500 may be implemented to perform the exemplary method in flowchart 700 of FIGS. 7A and 7B. For example, in order to initiate a call between two PSTN endpoints, a user may first make a request to initiate a call using the computer 302 (step 702). The IP network 304 may deliver the request to the SN 306 via the IP network 304 (step 704). In response to the request, the SN 306 may initiate a first SN call to a caller number of the caller telephone 310 (step 706). The caller number may be provisioned with a Termination_Attempt trigger. The first SN call may encounter the Termination_Attempt trigger at the first SSP 308 (step 708) and may cause the first SSP 308 to send a first Query Package to the SCP 502 (step 710). The first Query Package may contain a first Termination_Attempt TDP-Request message, which may be populated with CallingPartyID, CalledPartyID, and RedirectingPartyID parameters. The CallingPartyID may contain the number assigned to the SN 306. The CalledPartyID may contain the caller number. The RedirectingPartyID may be omitted from the Termination_Attempt TDP-Request message.

The SCP 502 may recognize the SN 306 number in the CallingPartyID and observe that the RedirectingPartyID is omitted (step 712). The omission may be used to indicate that the first SN call is to be allowed to complete to the caller telephone 310. The SCP 502 may send a first Response package to the first SSP 308 (step 714). The first Response package may contain an Authorize_Termination message, which is not populated with any parameters that would alter the processing of the first SN call. The first SSP 308 may complete the first SN call to the caller telephone 310 (step 716). When the caller device 310 answers the first SN call, the SN 306 may play an appropriate announcement, if any (step 718).

The SN 306 may then initiate a second SN call to the caller telephone 310 using a SETUP message (step 720). The SN 306 may specify the receiver telephone 314 number in the RedirectingNumber parameter of the SETUP message. The second SN call may encounter the Termination_Attempt trigger at the first SSP 308 (step 722), and may cause SSP 308 to send a second Query package to the SCP 502 (step 724). The CallingPartyID, CalledPartyID, and RedirectingPartyID parameters in the second Query package may contain the number assigned to the SN 306, the subscriber number, and the receiver telephone 314 number supplied by the SN 306, respectively.

The SCP 502 may recognize the SN 306 number and extract the receiver telephone 314 number from the RedirectingPartyID (step 726). The SCP 502 may send a second Response Package to the first SSP 308 (step 728). The second Response Package may contain a Forward_Call message, which may be populated with CallingPartyID, CalledPartyID, and RedirectingPartyID parameters. The CallingPartyID, CalledPartyID, and RedirectingPartyID parameters of the Forward_Call message may contain the subscriber number, the receiver telephone 314 number, and the subscriber number, respectively.

The first SSP 308 may forward the second SN call to the receiver telephone 314 via the second SSP 312 using the subscriber's carrier as provisioned in the first SSP 308, while respecting all relevant attributes, services, and features associated with the subscriber's line (step 730). If an announcement is to be played, the SN 306 may play the announcement when the receiver telephone 314 answers the second SN call (step 732). The SN 306 may connect the first and second SN calls at the first and second SSPs 308 and 312 using Two B-Channel Transfer (step 734) and may remove itself from the call path.

The exemplary method in the flowchart 700 may not require the SN 306 to be provisioned with the subscriber's carrier choices and may not need to analyze the called party number to determine which carrier is applicable. Further, the SN 306 may not need to be provisioned with any other attributes of the subscriber because the attributes provisioned at the first SSP 308 may be used to screen the first and second SN calls for potential toll restrictions and other telephone line options. Also, this method may place two SN calls from the SN 306 to the first SSP 308. If the SN 306 is served by an SSP other than the first SSP 308, then the two SN calls may be processed such that they are not billed.

A variation of the exemplary method in the flowchart 700 may be implemented in which a GenericAddress parameter is used instead of the RedirectingPartyID parameter. In this variation, the second SN call may specify the receiver telephone 314 number as the CallingPartyNumber in the SETUP message. The receiver telephone 314 number may fail the first SSP 308 screening and thus appear in the Termination_Attempt TDP-Request message as a GenericAddress in a similar manner to that described above for the flowchart 600 of FIG. 6. The SCP 502 may then examine the GenericAddress instead of the RedirectingPartyID to extract the receiver telephone 314 number. If the SSP serving the SN 306 is not the first SSP 308, then the SSP serving the SN 306 may be interconnected to SSP 308 via SS7 and may pass the GenericAddress to SSP 308, as specified in TR-NWT-000444, referenced above.

Figure 8:
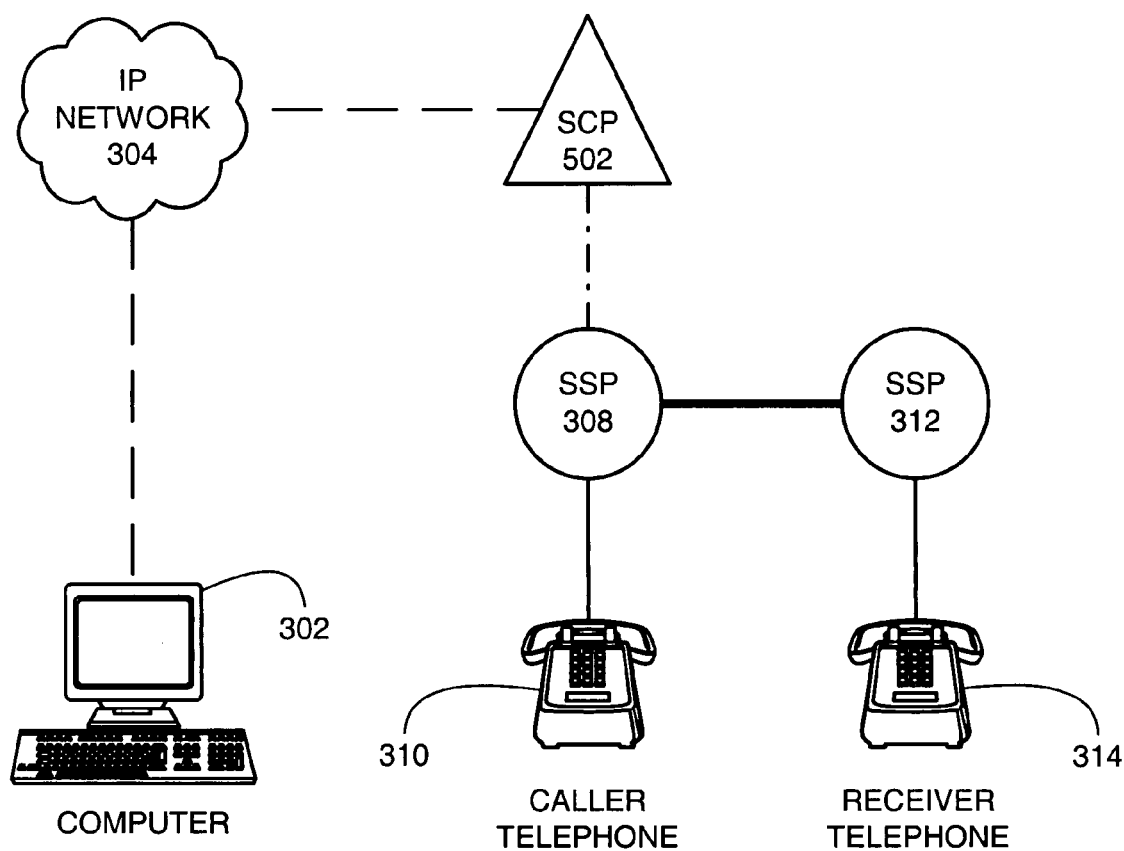
FIG. 8 illustrates a fourth exemplary system, consistent with embodiments of the present invention, for making a telephone call between PSTN endpoints.

In another embodiment of the present invention, the exemplary system 800 illustrated in FIG. 8 may be used to initiate a call between two PSTN endpoints. As shown in FIG. 8, the system 800 may include a computer 302, an IP network 304, an SCP 502, a first SSP 308, a caller telephone 310, a second SSP 312 and a receiver telephone 314. The computer 302 may be coupled to the IP network 304. The IP network 304 may be coupled to the SCP 502. The first SSP 308 may be coupled to the SCP 502, caller telephone 310, and the second SSP 312. The second SSP 312 may be coupled to the receiver telephone 314. By way of a non-limiting example, the IP network 304 may be coupled to the SCP 502 via an IP connection (e.g., Ethernet cable, fiber cable, etc.).

Figure 9A:
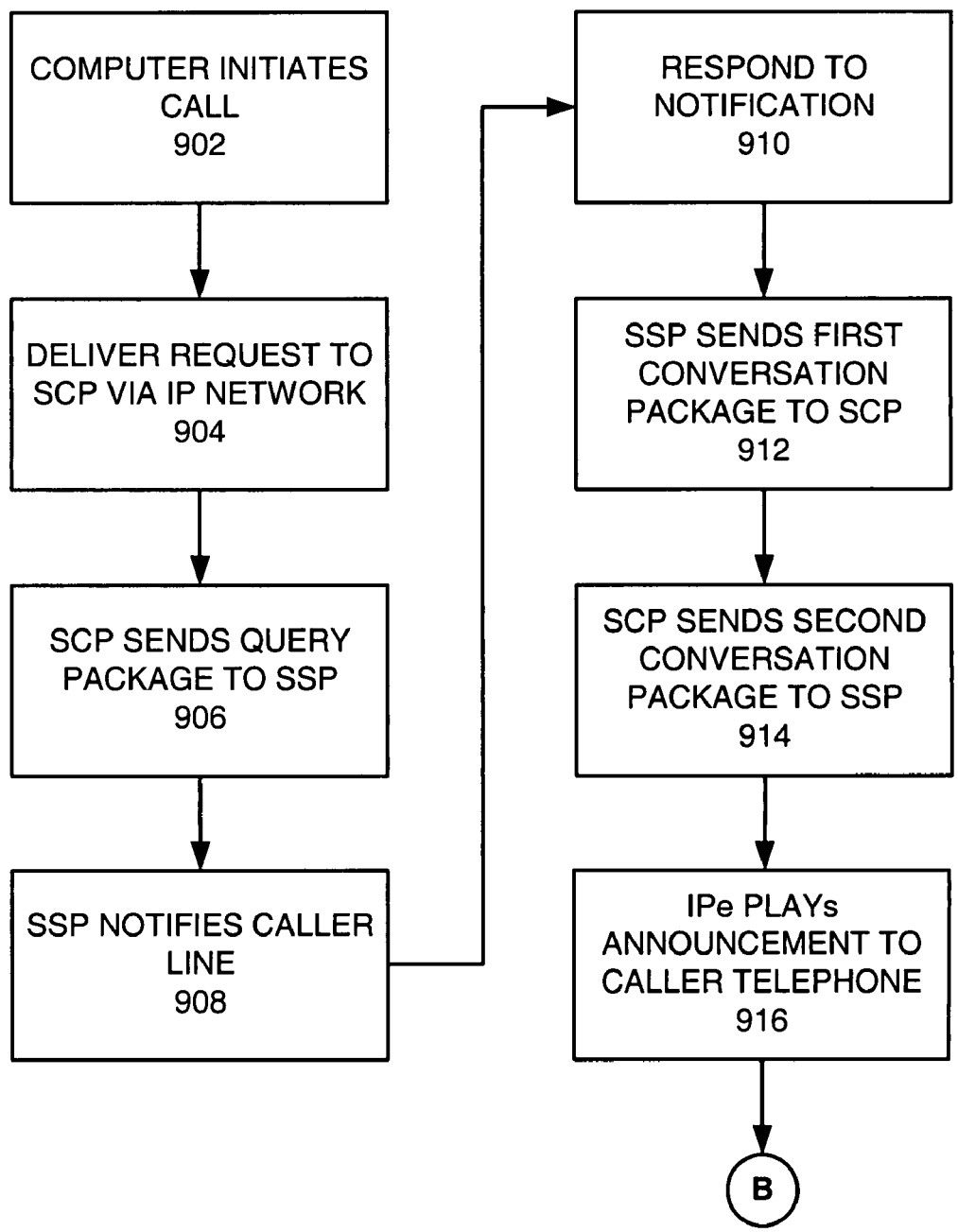
FIGS. 9A and 9B illustrate a fourth exemplary method, consistent with embodiments of the present invention, for making a telephone call between PSTN endpoints.
Figure 9B:
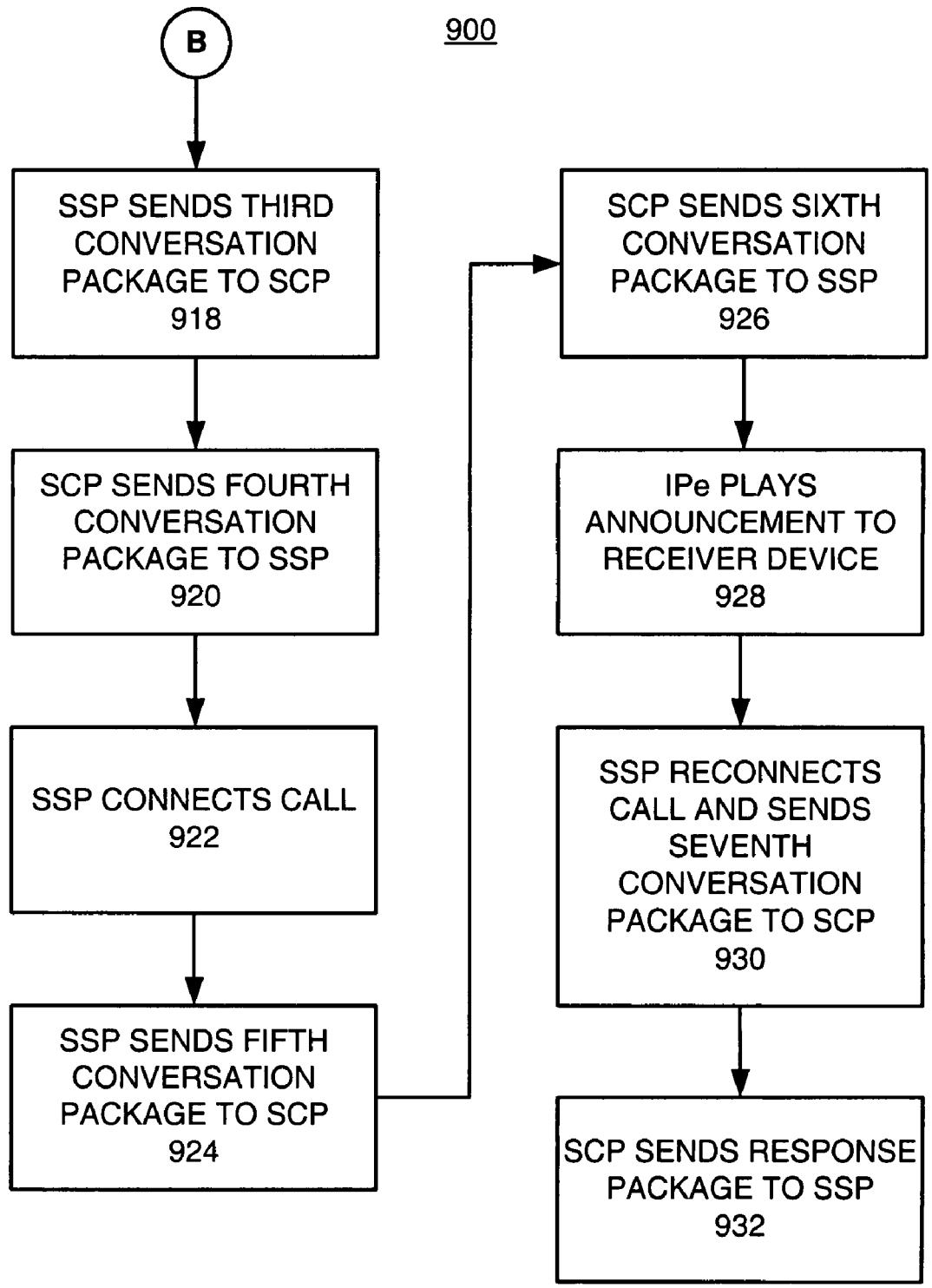

According to an embodiment of the invention, the system 800 may be implemented to perform the exemplary method in flowchart 900 of FIGS. 9A and 9B. For example, a user (not shown) may make a request to initiate a call using the computer 302 (step 902). The IP network 304 may deliver the request to the SCP 502 (step 904). The SCP 502 may send a Query Package to the first SSP 308 (step 906). The Query Package may contain a Create_Call message as specified, for example, in Section 5.9 of GR-1298-CORE. The Create_Call message may be populated with CallingPartyID and CalledPartyID parameters, which may contain the caller telephone 310 number and the receiver telephone 314 number, respectively. The Query Package may also contain a Request_Report_BCM_Event message. The Request_Report_BCM_Event message may be populated with an EDP-Request parameter, which may specify the Origination_Attempt event.

The first SSP 308 may notify the caller telephone 310 line (step 908). The first SSP 308 may perform such notification by, for example, applying power ringing to a non-ISDN line or sending a NOTIFY message to an ISDN line. The first SSP 308 may start a timer to await a caller response and may arm the Origination_Attempt EDP-Request. A caller may respond to the notification by going off-hook on the caller telephone 310 (step 910). When the first SSP 308 detects the caller telephone 310 off-hook indication or other response, the first SSP 308 may send a first Conversation Package to the SCP 502 (step 912). The first Conversation Package may contain an Origination_Attempt EDP-Request message.

In response to the first Conversation Package, the SCP 502 may send a second Conversation Package to the first SSP 308 (step 914). The second Conversation Package may contain a Send_To_Resource message as specified in Section 5.5.3 of GR-1298-CORE. The Send_To_Resource message may be populated with parameters that specify an Intelligent Peripheral (IPe) address and announcement identification. The first SSP 308 and an IPe (not shown) may interact as specified in GR-1129-CORE (referenced above) to connect the caller telephone 310 to the IPe and play any identified announcement (step 916). When the IPe finishes playing the announcement, the first SSP 308 may disconnect the caller telephone 310 from the IPe and send a third Conversation Package to the SCP 502 (step 918). The third Conversation Package may contain a Resource_Clear message.

The SCP 502 may then send a fourth Conversation Package to the first SSP 308 (step 920). The fourth Conversation Package may contain an Analyze_Route message and a Request_Report_BCM_Event message. The Analyze_Route message may not be populated with any routing parameters. The Request_Report_BCM_Event message may be populated with an EDPNotification, which may specify O_Answer and O_Disconnect_Called events. The first SSP 308 may proceed to connect the user-requested call from the caller telephone 310 to the receiver telephone 314 and may arm the O_Answer and O_Disconnect_Called EDPs (step 922). The O_Disconnect_Called EDP may be armed to keep an extended transaction open after the receiver telephone 314 answers. When the receiver telephone 314 answers, the second SSP 312 may send a fifth Conversation Package to the SCP 502 (step 924). The fifth Conversation Package may contain an O_Answer EDP-Notification message.

The SCP 502 may send a sixth Conversation Package to the second SSP 312 (step 926). The sixth Conversation Package may contain a Send_To_Resource message, which may be populated with parameters that specify an IPe address and announcement identification as well as a PartyID and PartyOnHold parameters. The PartyID and PartyOnHold may specify "calledparty" and "present", respectively. The second SSP 312 may place the caller telephone 310 on hold, connect the receiver telephone 314 to an IPe (not shown), and interact with the IPe as specified in GR-1129-CORE to play any identified announcement (step 928).

When the IPe finishes playing the announcement, the second SSP 312 may disconnect the receiver telephone 314 from the IPe, reconnect the caller telephone 310 to the receiver telephone 314, and send a seventh Conversation Package to the SCP 502 (step 930). The seventh Conversation Package may contain a Resource_Clear message. In reply, the SCP 502 may send a Response Package to the second SSP 312 (step 932). The Response Package may contain a Close message.

If no announcement is to be played to the caller telephone 310, then steps 914 to 916 may be omitted from the method in flowchart 900. If no announcement is to be played to the receiver telephone 314, then a Response Package may be sent at step 920 instead of the fourth Conversation Package and steps 924 to 932 may be omitted. The Response Package may contain a Continue message. If neither announcement is to be played, the Query Package sent at step 906 may omit the Request_Report_BCM_Event message, the first SSP 310 may send a Response Package to the SCP 502 at step 912 instead of the first Conversation Package, and steps 914 to 920 and 924 to 932 may be omitted. The Response Package may contain a Close Message.

In the foregoing description, various methods, systems, and articles of manufacture are described to invoke a telephone call between two PSTN endpoints as a result of activities in a separate network (e.g., IP, ATM, LAN, Internet, etc.). However, if the telephone call can be initiated from any point on a network, obvious security problems may exist. Unrestricted access would permit accidental or malicious placement of calls on behalf of subscribers who have not authorized such calls. Therefore, sufficient authentication procedures known in the art and compatible with embodiments of the present invention may be incorporated to ensure that only authorized subscribers are able to initiate calls from authorized telephone lines, etc.

In addition, the invention is not limited to the particulars of the embodiments disclosed herein. For example, the individual features of each of the disclosed embodiments may be combined or added to the features of other embodiments. In addition, the steps of the disclosed methods herein may be combined or modified without departing from the spirit of the invention claimed herein.

Also in the foregoing description, various features are grouped together in various embodiments for purposes of streamlining the disclosure. This method of disclosure is not to be interpreted as reflecting an intention that the claimed invention requires more features than are expressly recited in each claim. Rather, as the following claims reflect, inventive aspects may lie in less than all features of a single foregoing disclosed embodiment. Thus, the following claims are hereby incorporated into this description, with each claim standing on its own as a separate embodiment of the invention.

What is claimed is:

1. A method for making a call that is billed to a subscriber's telephone account, comprising:
   receiving a request to make the call on a packet-switched network;
   delivering the request from the packet-switched network to a circuit-switched network;
   initiating, over the circuit-switched network, a first leg of the call to a caller device based on the request;
   forwarding, over the circuit-switched network, a second leg of the call to a receiver device;
   specifying a subscriber's number in a setup message for the second leg of the call;
   sending a query message when the setup message triggers a setup trigger, the query message containing the subscriber's number and at least one of a calling party identification and a charge number;
   sending a response message containing the subscriber's number substituted in the at least one of the calling party identification and the charge number;
   connecting, over the circuit-switched network, the first leg and the second leg to make the call between the caller device and the receiver device; and
   billing the call requested on the packet-switched network to the subscriber's telephone account on the circuit-switched network.

2. The method of claim 1, wherein the caller device's telephone number is provisioned with a termination-attempt trigger, wherein initiating the first leg includes sending a second query message when the termination-attempt trigger is triggered, wherein the second query message contains the caller device's number and a calling party identification, and wherein the query message omits a redirecting party identification.

3. The method of claim 1, wherein the method further comprises initiating the second leg of the call to the caller device, wherein the caller device's telephone number is provisioned with a termination-attempt trigger, wherein initiating the second leg includes sending a second query message when the termination-attempt trigger is triggered and wherein the second query message contains a subscriber's number, a calling party identification, and the receiver device's number.

4. The method of claim 1, wherein the request includes at least one of a telephone number of a subscriber's telephone line, a telephone number of the caller device, and a telephone number of the receiver device.

5. The method of claim 1, wherein the call conforms to a subscriber's caller identification restriction and does not provide the subscriber's identification to the receiver device.

6. The method of claim 1, wherein billing comprises billing the call as if the subscriber originated the call on a subscriber's telephone line.

7. The method of claim 1, wherein the method further comprises providing a calling identity to the receiver device that indicates a subscriber's telephone line.

8. The method of claim 1, wherein the caller device is associated with a caller and wherein the caller and the subscriber are the same entity.

9. A method for making a call that is billed to a subscriber's telephone account, comprising:
   providing a request to make the call using a packet-switched network;
   delivering the request from the packet-switched network to a circuit-switched network;
   initiating, over the circuit-switched network, a leg of the call to a caller device based on the request;

specifying a subscriber's number in a setup message for the leg of the call;

sending a query message when the setup message triggers a setup trigger, the query message containing the subscriber's number and at least one of a calling party identification and a charge number;

sending a response message containing the subscriber's number substituted in the at least one of the calling party identification and the charge number;

originating, over the circuit-switched network, the call between a caller device and a receiver device based on the request; and billing the call requested on the packet-switched network to the subscriber's telephone account on the circuit-switched network.

10. The method of claim 9, wherein initiating the call includes sending a second query message and wherein the second query message contains a create call message.

11. The method of claim 9, wherein initiating the leg includes notifying the caller device with at least one of a power ring and a notify message.

12. The method of claim 9, wherein the method further comprises sending a conversation message, wherein the conversation message contains an Intelligent Peripheral's address and an announcement identification.

13. The method of claim 9, wherein originating the call arms at least one of an answer event and a disconnect called event.

14. The method of claim 9, wherein the method further comprises sending a conversation message, wherein the conversation message contains at least one of an Intelligent Peripheral's address, an announcement identification, a party identification, and a party on hold parameter.

15. The method of claim 9, wherein the call conforms to a subscriber's caller identification restriction and does not provide the subscriber's identification to the receiver device.

16. The method of claim 9, wherein billing comprises billing the call as if the subscriber originated the call on a subscriber's telephone line.

17. The method of claim 9, wherein the method further comprises providing a calling identity to the receiver device that indicates a subscriber's telephone line.

18. A method for making a call that is billed to a subscriber's telephone account, comprising:

sending a request to make the call on a packet-switched network, wherein the request is delivered from the packet-switched network to a circuit-switched network and wherein the request initiates, over the circuit-switched network, a first leg of the call to a caller device;

completing the first leg, wherein the first leg is connected, over the circuit-switched network, to a forwarded second leg of the call to make the call between the caller device and a receiver device and wherein the call requested on the packet-switched network is billed to the subscriber's telephone account on the circuit-switched networks;

specifying a subscriber's number in a setup message for the second leg of the call;

sending a query message when the setup message triggers a setup trigger, the query message containing the subscriber's number and at least one of a calling party identification and a charge number; and sending a response message containing the subscriber's number substituted in the at least one of the calling party identification and the charge number.

19. The method of claim 18, wherein the caller device is associated with a caller and wherein the caller and the subscriber are the same entity.

20. A method for making a call that is billed to a subscriber's telephone account, comprising:

providing a request to make the call using a packet-switched network, wherein the request is delivered from the packet-switched network to a circuit-switched network, wherein the request initiates, over the circuit-switched network, a leg of the call to a caller device, and wherein the request originates, over the circuit-switched network, the call between the caller device and a receiver device;

specifying a subscriber's number in a setup message for the leg of the call;

sending a query message when the setup message triggers a setup trigger, the query message containing the subscriber's number and at least one of a calling party identification and a charge number;

sending a response message containing the subscriber's number substituted in the at least one of the calling party identification and the charge number; and completing the call, wherein the call requested on the packet-switched network is billed to the subscriber's telephone account on the circuit-switched network.

21. The method of claim 20, wherein the caller device is associated with a caller and wherein the caller and the subscriber are the same entity.

* * * * *